May 13, 1969

J. W. REEVES 3,443,360

FLUID BED COOLER FOR GAS SEPARATION

Filed Oct. 12, 1967

INVENTOR
JAMES W. REEVES

BY  *Carl A. Hechmer*

ATTORNEY

United States Patent Office 3,443,360
Patented May 13, 1969

3,443,360
FLUID BED COOLER FOR GAS SEPARATION
James W. Reeves, Wilmington, Del., assignor to E. I. du Pont de Nemours and Company, Wilmington, Del., a corporation of Delaware
Filed Oct. 12, 1967, Ser. No. 674,979
Int. Cl. B01d 53/08, 5/00
U.S. Cl. 55—71                                5 Claims

ABSTRACT OF THE DISCLOSURE

Apparatus and a process for the fractionation of gases into at least two components which comprises cooling the gases in a fluid bed of particles inert to the gases to condense at least one component of the gases while leaving at least one other component uncondensed; removing portions of the bed with the condensed component thereon, removing the condensed component from the inert particles, and recycling the inert particles to the fluid bed for reuse.

BACKGROUND OF THE INVENTION

Many methods have been suggested in the prior art whereby products of chlorination processes may be cooled and separated into their components. These processes suggest various means whereby the gaseous products of chlorination or oxidation processes may be quenched. There is disclosed, for example, in U.S. 2,580,635, a process whereby sand is used to provide a condensation surface for hot vapors resulting from the chlorination of titaniferous ores. In this process the cooled sand and hot vapors are contacted countercurrently and the hot sand with condensed solids and vapors are transported to a separate section of the system where the condensed solids are separated from the sand and the sand is conveyed again to the cooling chamber to be used again in the condensation of gases from the chlorination process. Although the large amount of surface area provided by the sand in this system very efficiently provides for the condensation or hot vapors thereupon, disadvantages are found in the system in that large amounts of solids must be conveyed, necessitating large and costly pieces of equipment. Such a conveyed system also is subject to frequent plug-ups, and to achieve satisfactory operation, extremely careful control of temperature must be maintained.

Other well-known means of quenching gases and separating these into their components include spray condensers such as that described in U.S. 2,446,181. Again, such equipment is costly and often not very efficient in clean separation of component condensation products.

STATEMENT OF INVENTION

According to the present invention, there is provided a fluidized bed of inert material, preferably of sand, into which the off-gases from a chlorination or oxidation reactor are introduced as the fluidizing medium. The fluidized bed material acts to provide surface upon which higher boiling components of the fluidizing gas stream will condense, permitting lower boiling gaseous components to exit from the fluidized bed chamber through one or more outlets at the top of the chamber. The fluidized bed of inert material has cooling means, preferably water-cooled fin type coolers projecting into the fluidized bed. These fin-type coolers are so located in the reactor that the fluidized inert material may circulate freely when the bed is in operation. If desired, additional cooling may be effected by providing the fluid bed reactor with a water-cooled jacket. Continuous operation of the system is maintained by withdrawing from the bed portions of the inert material upon the surface of which solids have condensed, and replacing these inert solids with fresh or reconditioned inert material.

THE DRAWINGS

Figure 1:
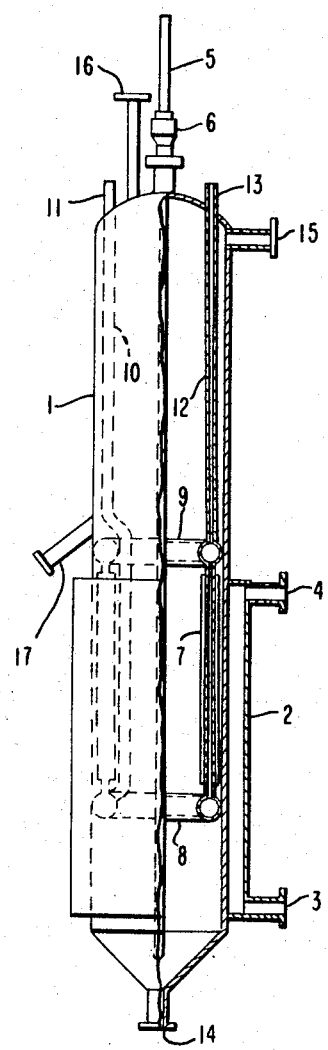
Figure 2:
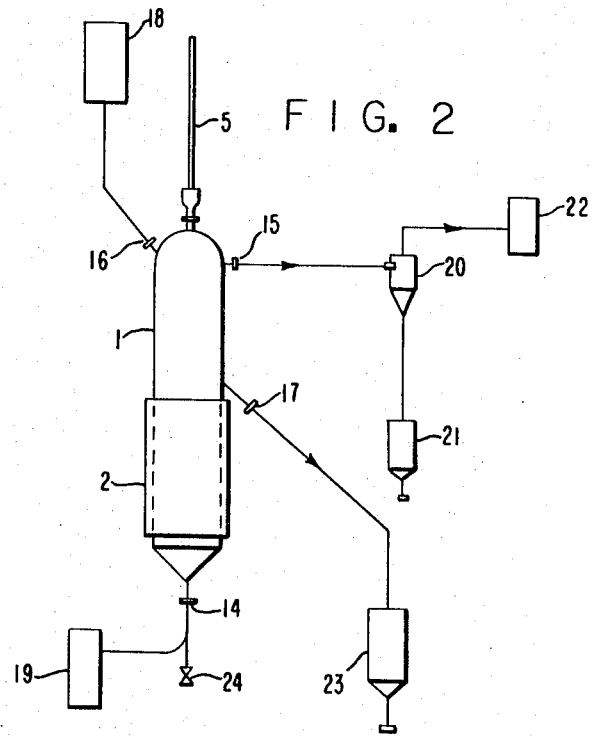

FIGURE 1 is an elevation, partially in section, illustrating the separation apparatus of the present invention.
FIGURE 2 is a diagrammatic illustration of a system employing the apparatus of FIGURE 1 as a component.

Referring more particularly to FIGURE 1, the reactor shell 1 is jacketed over its lower portions by coolant jacket 2 through which a cooling fluid is introduced at port 3 and removed at port 4. A poke rod 5 extends through the center of reactor shell 1 through a gas locking seal 6. Internal cooling of the shell is provided by a series of fin-bearing tubes 7 distributed between toroidally-shaped intake manifold 8 and exhaust manifold 9. Coolant feed line 10 connects manifold 8 with coolant intake port 11 while coolant exhaust line 12 connects manifold 9 with coolant exhaust port 13. Feed gases are introduced to the system through feed gas port 14 and the cooled gases are removed through off gas exit port 15. Inert material is supplied to the system at inert material entrance port 16 and withdrawn at inert material exit port 17. During operation the feed gas is supplied at sufficient velocity to maintain substantially all of the inert material in a fluidized and suspended state. Whatever solids do clog feed gas port 14 can be removed by manipulation of poke rod 5.

In FIGURE 2 the fluid bed reactor is shown as a system component to illustrate its function in the process of separating a gaseous mixture into its several components. In a typical process, inert material (sand) is fed from inert material storage 18 into shell 1 through entrance port 16 where it encounters a counter-current flow of hot, raw, mixed gases from feed gas supply 19 that enters shell 1 at port 14. The gas is fed at sufficient velocity to maintain the inert material in a fluidized, suspended state within shell 1. As the hot gases contact the inert particles which are cooled in the region of jacket 2, higher boiling fractions of the gas are condensed on the surfaces of the particles. The off-gas leaves shell 1 at exit port 15 and passes to a cyclone separator 20 from which separated solids drop into collection pot 21 while off-gases are collected at off-gas storage 22. The cooled and coated inert solids are continuously removed from shell 1 at exit port 17 and fed into collection chamber 23 from which they are withdrawn to be reconditioned by removal of condensed solids and returned to inert material storage 18. Whatever solids fall into feed gas port 14 are removed by manipulation of poke rod 5, these solids being removed from time to time through valve 24.

One practical and particularly valuable adaptation of the process of this invention is the separation of chlorine gas from unreacted oxides and higher-boiling chlorides in a system wherein ferric chloride resulting from the chlorination of titaniferous ores is oxidized for the recovery and reuse of chlorine values. The principal reaction carried out in a chloride-oxidation process is the following:

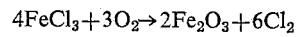

The following examples are cited to illustrate the invention. They are not intended to limit it in any manner.

Example 1

As an example of the operation of the present invention, the off-gases from a reactor in which the oxidation of ferric chloride is carried out are quenched and the chlorine product separated from unreacted metal chlorides and by-product ferric oxide. The off-gas from the ferric chloride oxidation unit, which is led into the bed of particulate inert material through inlet port 14 at a temperature of 500–700° C. is analyzed at 50–70 vol. percent chlorine, 10–50% $O_2$, 15–25% $CO_2$, 5–90% $N_2$ and 1–30% FeCl$_3$. A bed of 4 to 5 foot depth is maintained in the sand cooler of 16″ diameter and fluid bed operation is effected and maintained under a superficial gas velocity of 0.3 to 1.0 ft./sec. and 30 p.s.i.g. pressure.

The particulate inert bed material used in this example is mineral rutile of particle size 80 to 100 mesh (U.S. Standard Sieve Scale) and the temperature of the bed is maintained at 50–250° C. by circulation of water through the fin-type coolers. Heat transfer coefficients of 10 to 20 pcu./hr./ft.$^2$/° C. are observed. Gas temperature is found to be in virtual equilibrium with the fluid bed within one foot of the gas inlet. In this operation, it is found that about 70 to 90% of the ferric chloride content of the gas feed condenses as a coating on the surfaces of the inert particles and the remaining 10–30% collects as fines in the cooling chamber or are entrained with the off-gas chlorine.

Example 2

In another example of the operation of this invention, mineral rutile of 80 to 100 mesh size is used as the particulate inert bed material in a fluid bed reactor of two-foot diameter, the bed depth being five feet. In this case, the fluid bed of inert particles serves to separate titanium tetrachloride from ferric chloride (and other condensable chlorides) which comprised a gas stream from a titaniferous ore chlorinating unit. The composition of the gas fed to the fluid bed reactor through port 14 at the bottom of the reactor is of the following composition, by volume:

| | Percent |
|---|---|
| FeCl$_3$ | 5–20 |
| FeCl$_2$ | 0–20 |
| N$_2$ and O$_2$ | 0–10 |
| TiCl$_4$ | 20–30 |
| CO$_2$ | 20–50 |
| CO | 1–30 |
| HCl | 0–10 |
| Other chlorides | 0–5 |

The gas is introduced to the reactor at a superficial velocity of 0.3 to 1.0 ft./sec. at a temperature of 950° C. The temperature of the gas at the outlet of the reactor is 250° C. and the exit gas pressure 5 p.s.i.g. Heat transfer coefficients of 10 to 20 pcu./hr./ft.$^2$/°C. are measured. It is found that about 90% of the ferric chloride content of the inlet gas is removed by the fluid bed action and essentially all of the TiCl$_4$ passes out of the reactor as a component of the exit gas.

It will be obvious that the process of the present invention may be performed in apparatus other than that specifically illustrated herein. It is only necessary that a gravity-fed flow of particulate solid material be fed counter-currently to the flow of a hot mixture of gases of different boiling points in a manner to provide a suspended fluidized bed of the particles in a cooled, confined zone.

Many equivalent modifications of the above will become apparent to those skilled in the art from a reading of the above, without a departure from the inventive concept.

What is claimed is:

1. A process for the separation of at least one component from a mixture of gases, the components of which possess different boiling points, which comprises (1) contacting, in fluidized bed operation, the said mixture and an inert particulate solid material in a cooled zone located near the lower end of said fluidized bed, the flow of said mixture having a velocity sufficient to suspend the said particulate solid material in the said cooled zone, (2) removing from the said cooled zone at least one of the lower boiling components of the said mixture at above its boiling point, and (3) removing from the said cooled zone adjacent the top portions of the said particulate solid material bearing at least one higher-boiling condensed component of said mixture therewith.

2. The process of claim 1 in which the said mixture comprises the off-gas from a reactor in which titaniferous ore is chlorinated and the said lower-boiling component is titanium tetrachloride and the said higher-boiling component is ferric chloride.

3. The process of claim 1 in which the said lower-boiling component is chlorine, the said mixture being obtained from a process wherein ferric chloride has been oxidized according to the chemical reaction:

$$4FeCl_3 + 3O_2 \rightarrow 6Cl_2 + 2Fe_2O_3$$

4. The process of claim 1 wherein the said lower boiling component is a mixture of chlorine and gaseous metal chlorides and the said higher boiling component is a mixture of unreacted ferric oxide and high-melting chlorides, the said mixture of components having been formed from the oxidation of a ferric chloride-rich product of ore chlorination and wherein the said mixture of components, at a temperature of from about 500 to about 700° C., is introduced into a chamber containing a bed of inert particulate solid material, the said cooled zone maintained at a temperature from about 50° to 250° C.

5. A gas and suspended-solids contact chamber comprising a closed elongated shell having an upper end and a lower end; an internal and external cooling means disposed adjacent said lower end; a feed gas inlet port disposed near the extremity of the said lower end; a recovery gas outlet port disposed near the extremity of the said upper end; a solids entrance port near the extremity of the said upper end; a solids exit port near the upper extremity of the said cooling means; a poke rod slideably mounted through the said shell with a free end in slideable contact with the bore of the said feed gas inlet port; said internal cooling means comprising a pair of toroidally shaped manifolds, mounted on parallel planes, the said planes being centered upon and normal to the longitudinal axis of the said shell, the said manifolds being connected to each other by a multiplicity by fin bearing tubes, one said manifold having an inlet port extending outside of the said shell, and the other said manifold having an outlet port extending outside of the said shell.

References Cited

UNITED STATES PATENTS

| 2,580,635 | 1/1952 | Winter | 55—71 |
| 2,925,145 | 2/1960 | Hayden | 55—82 |
| 2,941,862 | 6/1960 | Cyr et al. | 23—284 |
| 3,087,253 | 4/1963 | Wulf | 34—10 |
| 3,360,866 | 1/1968 | Shirai | 34—10 |

REUBEN FRIEDMAN, *Primary Examiner.*

C. N. HART, *Assistant Examiner.*

U.S. Cl. X.R.

55—82, 269